(12) United States Patent
Pulier et al.

(10) Patent No.: US 12,149,455 B2
(45) Date of Patent: Nov. 19, 2024

(54) VIRTUAL COMPUTING SERVICES DEPLOYMENT NETWORK

(71) Applicant: VMware, Inc., Palo Alto, CA (US)

(72) Inventors: Eric Y. Pulier, Los Angeles, CA (US); Clinton B. Battersby, Norwood, MA (US); Paul J. Gaffney, Southborough, MA (US)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 18/144,809

(22) Filed: May 8, 2023

(65) Prior Publication Data

US 2023/0275851 A1      Aug. 31, 2023

Related U.S. Application Data

(63) Continuation of application No. 17/148,380, filed on Jan. 13, 2021, now Pat. No. 11,671,380, which is a
(Continued)

(51) Int. Cl.
*H04L 47/70*    (2022.01)
*G06Q 10/06*    (2023.01)
*G06Q 10/0631*  (2023.01)

(52) U.S. Cl.
CPC .......... *H04L 47/822* (2013.01); *G06Q 10/06* (2013.01); *G06Q 10/0631* (2013.01)

(58) Field of Classification Search
CPC ... H04L 47/822; G06Q 10/06; G06Q 10/0631
See application file for complete search history.

(56) References Cited

U.S. PATENT DOCUMENTS 5,063,500 A    11/1991   Shorter
5,564,016 A    10/1996   Korenshtein
(Continued)

OTHER PUBLICATIONS

Chaisiri, et al., "Optimization of Resource Provisioning Cost in Cloud Computing"; IEEE Transaction on Services Computing; 5(2):164-177; Apr.-Jun. 2012.
(Continued)

*Primary Examiner* — Jenee Holland
(74) *Attorney, Agent, or Firm* — Kim & Stewart LLP

(57) ABSTRACT

A business method associates provisioning costs with a usage history indicative of user computing demand, and coalesces the cost data to identify an appropriate provisioning level balancing the provisioning cost and the usage demand cost. Conventional computing environments suffer from the shortcoming of being prone to overprovisioning or underprovisioning a user. Such misprovisioning is inefficient because it denotes underutilized computing resources or ineffective and/or disgruntled users. Costs increase either due to the excessive hardware bestowed on the overprovisioned user, or in support costs addressing the underprovisioned user. Configurations herein substantially overcome such shortcomings by defining a policy indicative of over-provisioning and underprovisioning indicators (misprovisioning flags), and defining rules to specify a triggering event indicating the need to reassess the provisioning of a user.

15 Claims, 7 Drawing Sheets

Related U.S. Application Data continuation of application No. 16/167,475, filed on Oct. 22, 2018, now Pat. No. 10,897,430, which is a continuation of application No. 13/716,289, filed on Dec. 17, 2012, now Pat. No. 10,110,512, which is a continuation of application No. 11/875,375, filed on Oct. 19, 2007, now Pat. No. 8,335,703.

(60) Provisional application No. 60/853,052, filed on Oct. 20, 2006.

(56) References Cited

U.S. PATENT DOCUMENTS

| | | | | |
|---|---|---|---|---|
| 5,774,878 | A | 6/1998 | Marshall | |
| 6,038,677 | A | 3/2000 | Lawlor | |
| 6,055,563 | A | 4/2000 | Endo | |
| 6,067,545 | A | 5/2000 | Wolff | |
| 6,070,142 | A | 5/2000 | McDonough | |
| 6,178,159 | B1* | 1/2001 | He | H04Q 11/0478 370/468 |
| 6,335,927 | B1 | 1/2002 | Elliott | |
| 6,341,303 | B1 | 1/2002 | Rhee | |
| 6,505,244 | B1 | 1/2003 | Natarajan | |
| 6,532,234 | B1* | 3/2003 | Yoshikawa | H04L 49/205 370/395.4 |
| 6,615,253 | B1 | 9/2003 | Bowman-Amuah | |
| 6,799,209 | B1 | 9/2004 | Hayton | |
| 6,877,163 | B1* | 4/2005 | Jones | G06F 9/548 719/331 |
| 6,981,042 | B1 | 12/2005 | Rey | |
| 7,043,695 | B2 | 5/2006 | Elber | |
| 7,069,437 | B2 | 6/2006 | Williams | |
| 7,299,033 | B2 | 11/2007 | Kjellberg | |
| 7,340,522 | B1 | 3/2008 | Basu | |
| 7,373,451 | B2 | 5/2008 | Lam | |
| 7,398,349 | B2 | 7/2008 | Birrell | |
| 7,587,352 | B2 | 9/2009 | Arnott | |
| 7,802,248 | B2 | 9/2010 | Broquere | |
| 7,917,450 | B1 | 3/2011 | Musuvathy | |
| 8,166,475 | B1 | 4/2012 | Scales | |
| 8,239,608 | B1 | 8/2012 | Ginzton | |
| 8,387,132 | B2 | 2/2013 | Frank | |
| 8,549,513 | B2 | 10/2013 | Vinberg | |
| 8,560,671 | B1 | 10/2013 | Yahalom | |
| 8,725,886 | B1 | 5/2014 | Pulier | |
| 10,110,512 | B2 | 10/2018 | Pulier | |
| 10,897,430 | B2 | 1/2021 | Pulier | |
| 2001/0040591 | A1 | 11/2001 | Abbott | |
| 2001/0056494 | A1 | 12/2001 | Trabelsi | |
| 2002/0069102 | A1 | 6/2002 | Vellante | |
| 2002/0073135 | A1 | 6/2002 | Meyer | |
| 2002/0091697 | A1 | 7/2002 | Huang | |
| 2002/0129126 | A1 | 9/2002 | Chu | |
| 2002/0152094 | A1 | 10/2002 | Fahraeus | |
| 2002/0191539 | A1* | 12/2002 | Rawlins | H04L 12/1403 370/395.2 |
| 2003/0006988 | A1 | 1/2003 | Alford | |
| 2003/0055666 | A1 | 3/2003 | Roddy | |
| 2003/0149567 | A1 | 8/2003 | Schmitz | |
| 2004/0003087 | A1 | 1/2004 | Chambliss | |
| 2004/0024627 | A1 | 2/2004 | Keener | |
| 2004/0054786 | A1 | 3/2004 | Kjellberg | |
| 2004/0054787 | A1 | 3/2004 | Kjellberg | |
| 2004/0093247 | A1 | 5/2004 | Baken | |
| 2004/0148602 | A1 | 7/2004 | Ottati | |
| 2004/0208500 | A1 | 10/2004 | Kiyosu | |
| 2004/0239700 | A1 | 12/2004 | Baschy | |
| 2005/0058130 | A1* | 3/2005 | Christ | H04L 47/16 370/389 |
| 2005/0108362 | A1* | 5/2005 | Weinert | H04L 67/10 709/217 |
| 2005/0108709 | A1 | 5/2005 | Sciandra | |
| 2005/0132054 | A1 | 6/2005 | Chang | |
| 2005/0144402 | A1* | 6/2005 | Beverly | G06F 12/1475 711/E12.095 |
| 2005/0198130 | A1 | 9/2005 | Bosloy | |
| 2005/0198303 | A1 | 9/2005 | Knauerhase | |
| 2005/0216920 | A1 | 9/2005 | Tewari | |
| 2005/0268053 | A1* | 12/2005 | Sexton | G06F 11/3636 711/170 |
| 2005/0273568 | A1 | 12/2005 | Blandy | |
| 2005/0273862 | A1 | 12/2005 | Benaloh | |
| 2005/0283585 | A1* | 12/2005 | Sexton | G06F 11/366 711/171 |
| 2006/0005184 | A1 | 1/2006 | Tewari | |
| 2006/0025985 | A1* | 2/2006 | Vinberg | G06F 8/10 703/22 |
| 2006/0026558 | A1 | 2/2006 | Beringer | |
| 2006/0036941 | A1 | 2/2006 | Neil | |
| 2006/0041761 | A1 | 2/2006 | Neumann | |
| 2006/0070077 | A1 | 3/2006 | Erlandson | |
| 2006/0080702 | A1 | 4/2006 | Diez | |
| 2006/0107194 | A1* | 5/2006 | Gale | G06F 9/4411 715/764 |
| 2006/0111188 | A1 | 5/2006 | Winkler | |
| 2006/0143084 | A1 | 6/2006 | Donnelli | |
| 2006/0143417 | A1 | 6/2006 | Poisner | |
| 2006/0143617 | A1 | 6/2006 | Knauerhase | |
| 2006/0212740 | A1 | 9/2006 | Jackson | |
| 2006/0253848 | A1 | 11/2006 | Mathieu | |
| 2006/0276174 | A1 | 12/2006 | Katz | |
| 2006/0294238 | A1 | 12/2006 | Naik | |
| 2007/0016432 | A1 | 1/2007 | Piggott | |
| 2007/0043861 | A1 | 2/2007 | Baron | |
| 2007/0083630 | A1 | 4/2007 | Roth | |
| 2007/0106798 | A1 | 5/2007 | Masumitsu | |
| 2007/0157309 | A1 | 7/2007 | Bin | |
| 2007/0214455 | A1 | 9/2007 | Williams | |
| 2007/0250833 | A1 | 10/2007 | Araujo | |
| 2007/0260723 | A1 | 11/2007 | Cohen | |
| 2008/0005398 | A1 | 1/2008 | Huffman | |
| 2008/0080552 | A1 | 4/2008 | Gates | |
| 2008/0091761 | A1 | 4/2008 | Tsao | |
| 2008/0147671 | A1 | 6/2008 | Simon | |
| 2008/0184225 | A1 | 7/2008 | Fitzgerald | |
| 2008/0301674 | A1 | 12/2008 | Faus | |
| 2009/0094316 | A1 | 4/2009 | Chen | |
| 2009/0199177 | A1 | 8/2009 | Edwards | |
| 2010/0088699 | A1 | 4/2010 | Sasaki | |
| 2012/0110574 | A1 | 5/2012 | Kumar | |
| 2019/0058671 | A1 | 2/2019 | Pulier | |

OTHER PUBLICATIONS

US Notice of Allowability in U.S. Appl. No. 11/875,297, dated Jan. 2, 2014, 17 pages.
US Notice of Allowability in U.S. Appl. No. 11/875,375, dated Nov. 30, 2012, 6 pages.
US Office Action in U.S. Appl. No. 11/875,297, dated Apr. 2, 2010, 21 pages.
US Office Action in U.S. Appl. No. 11/875,297, dated May 11, 2012, 25 pages.
US Office Action in U.S. Appl. No. 11/875,375, dated Apr. 20, 2012, 10 pages.
US Office Action in U.S. Appl. No. 11/875,375, dated Mar. 8, 2011, 12 pages.
US Office Action in U.S. Appl. No. 11/875,297, dated Mar. 3, 2013, 25 pages.
US Office Action in U.S. Appl. No. 11/875,297, dated Oct. 5, 2009, 17 pages.
US Office Action in U.S. Appl. No. 11/875,375, dated Sep. 28, 2010, 11 pages.

* cited by examiner

VIRTUAL COMPUTING SERVICES DEPLOYMENT NETWORK

CLAIM TO BENEFIT OF EARLIER FILED PATENT APPLICATIONS

This application is a continuation application of U.S. application Ser. No. 17/148,380, filed on Jan. 13, 2021, which is a continuation application of U.S. application Ser. No. 16/167,475, filed on Oct. 22, 2018, which is a continuation application of U.S. application Ser. No. 13/716,289, filed on Dec. 17, 2012, which is a continuation application of U.S. application Ser. No. 11/875,375, filed on Oct. 19, 2007, and claims the benefit of U.S. Provisional Application No. 60/853,052, filed on Oct. 20, 2006, all of which are incorporated herein by reference in their entirety.

BACKGROUND

There is a nearly universal mandate in corporations, governments and academic institutions to better control the escalating costs and complexity of managing desktops in large numbers and across widely disparate geographies. In addition, most companies continue to deploy traditional physical desktop computers running at less than 10% capacity, resulting in enormous waste of time, money and energy. Modem enterprises expend substantial capital to maintain an IT infrastructure. In the computer realm, there is a continuing shift from initial deployment costs to ongoing maintenance costs. Traditionally, a computing infrastructure was marked with substantial up-front costs due to the high cost of computing hardware and memory resources. However, with the ongoing trend of reduced costs for computing hardware, and the converse trend of increased compensation for skilled personnel to support and maintain computer systems, a typical enterprise spends more to maintain a user then the cost to initially outfit the user. Consistent with a trend known in the industry as "Moore's law," computing power per dollar continues to double roughly every 18 months, while support costs, such as help desk staffing, software upgrades, and hardware enhancements, continue to burden the cost of provisioning a user.

This shift in cost from acquisition to maintenance has provided a motivation for "overprovisioning" a user. The classic overprovisioned user is the high ranking, non-technical executive who requisitions a PC that is more powerful than any subordinates, yet is employed only for reading an occasional email. Nonetheless, the above stated trend brings the reality that it may be less expensive to initially overprovision a user than to later remedy an underprovisioned user. However, it is impractical if not impossible with physical desktops to optimally provision a user such that the user is neither overprovisioned or underprovisioned, and continue to bear the burden in the form of responding to and upgrading an underprovisioned user or absorbing the inefficiency of an overprovisioned user. For a substantial sized enterprise with many users, such as corporations, universities, and other enterprises, the aggregate capital and energy costs can be substantial.

SUMMARY

Information technology (IT) infrastructure costs are substantial and continue to rise for most modem enterprises. Further, the modem trend of increasingly inexpensive hardware and increased support services has shifted the cost burden from initial deployment to ongoing maintenance and operations. The overall result suggests that while the cost of acquiring a personal computer has fallen for decades, the total/run-rate cost of ownership continues to rise. Additive to this phenomenon is an ever-increasing security risk to the client-based software for acquiring, maintaining and deploying current applications.

In a virtual computing environment as disclosed and claimed herein, a virtual computing services deployment assigns a user to a provisioning virtual desktop class (class) based on the expected resources that user will consume. Rather than deploy a user with a conventional PC, the user rendering device is a so-called "thin client" device as a graphical user interface (i.e. GUI) a cost efficient hardware assemblage of a keyboard/pointing device, visual output display, and sufficient CPU and memory to transact with the virtualized desktop computing instance at a remote computing services deployment. The "thin client" device does not require any mass storage and requires only a modest CPU and memory resulting in reduced cost and significantly lower power consumption.

A "best fit" provisioning metric associates provisioning costs with a usage history indicative of user computing demand, and coalesces the cost data to identify an appropriate provisioning-level balancing the provisioning cost and the usage demand cost.

The assigned computing classes include a shared OS environment (often referred to as terminal server, Microsoft® TS or Citrix® CPS) environment, for multiple users of moderate usage, a hypervisor environment providing the individual user with their own OS, memory, CPU and storage with better isolation from other users, and grid services, for high demand users and those who "spike" substantial demands and/or require resources well above the typical demand -providing computing resources on demand -minimizing capital costs and maximizing capital utilization.

Further detail on class provisioning is available in U.S. Pat. No. 8,725,886, filed Oct. 19, 2007, entitled "PROVISIONED VIRTUAL COMPUTING", incorporated here by reference. The virtual environment allows unutilized resources that would otherwise take the form of an unused desktop PC to be instead used by other users in the virtual computing environment. This virtualization allows an optimal, or "best fit" provisioning of users such that each user is neither overprovisioned nor underprovisioned.

Configurations defined herein are based, in part, on the observation that many enterprises typically err on the side of overprovisioning a user to offset the impact of manually reconfiguring, servicing, or outright replacing computing resources allocated to an underprovisioned user. Further, in a conventional PC based enterprise environment, each user has a dedicated set of resources (i.e. desktop PC) which is not reallocatable for other uses when idle or when the user logs out/powers down the system. Thus, each idle PC represents a source of wasted computing resources and capital expense when the user is overprovisioned. In contrast, a user who consistently utilizes available CPU and memory on their PC is an underprovisioned user who would benefit from additional computing resources. A management perspective favoring lean IT budgets may result in a preponderance of underprovisioned users. Such underprovisioned users tend to generate increased requests for resource adjustments, in the way of help desk calls and requisitions for increased resources (memory/CPU) and/or new equipment.

Conventional computing environments suffer from the shortcoming of increased IT costs due to inefficiently overprovisioning or underprovisioning a user. Such misprovisioning is inefficient because it denotes underutilized computing resources or ineffective and/or disgruntled users. Costs increase either due to the excessive hardware bestowed on the overprovisioned user, or in support costs addressing the underprovisioned user.

Configurations herein substantially overcome such shortcomings by defining a best-fit metric indicative of costs of overprovisioning and underprovisioning, computing an appropriate provisioning level by coalescing the cost information, and periodically reassessing the provisioning of a user to maintain an appropriate provisioning level. Such reprovisioning occurs automatically upon occurrences of predetermined events, and may even be undetectable to the user. Since the reprovisioning can either expand or contract the resources available to a particular user, users are matched to an optimal, or "best fit" computational resource set to correspond to the demands of the particular user. For example, when a user logs on, their desktop is "created" at that moment from the ingredients that compose their individual configuration (software, files, preferences, etc.). When a desktop session is ended, there is no physical PC remaining, but rather the resource allocated is now returned for availability to the collective pool at the virtual computing services deployment (typically a virtual environment rack, or cluster). When a desktop is left running and the user disconnects from the thin client device, the work in progress continues such that when the user logs on again, they are reconnected to their desktop which is in the same "state" it was in when they disconnected, which need not be at the same thin client device.

In further detail, configurations herein disclose a method of managing computing infrastructure costs by defining a set of computing classes, such that each computing class is associated with a per user cost, and accumulating a usage history corresponding to each user in a set of users, in which the usage history is indicative of the computing demands of each user. A provisioner in the virtual computing services deployment analyzes the computing demands to define a user profile for each user, such that the computing demands are indicative of a provisioning cost of the user. An instance server provisions each user in a particular computing class based on the user profile, the per user cost and the provisioning cost, and an instance manager periodically invokes the provisioner to reanalyze the computing demands to selectively reprovision the user.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor and a storage, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Conventional computing environments require manual reprovisioning, which is typically in response to an explicit complaint or negative occurrence on behalf of the acting user. Even more elusive are overprovisioned users, as overprovisioning rarely generates negative feedback, however is typically indicative of underutilized computing resources. Configurations herein coalesce provisioning with individual user demands to avoid underprovisioning and overprovisioning (misprovisioning). Provisioning reassessment is performed periodically, such as on logout of a user, or in response to detrimental events (typically an indicator of underprovisioning).

The disclosed virtual computing environment differs from conventional centralized server arrangements because conventional centralized computing environments do not coalesce cost and user demand to determine an appropriate provisioning level, or maintain a correlation of user activity to misprovisioning events, and do not automatically assess and reassign user provisioning as a result of a misprovisioning determination. In contrast, configurations herein compute a provisioning class based on expected usage demands weighed with the cost of provisioning a user in a particular class, and continually monitor and reevaluate the class to assure an appropriate provisioning level for the user. Conventional arrangements require manual reconfiguration, typically through burdensome manipulation of configuration files, and reprovisioning generally only occurs after interaction with a system manager or operation staff member. Further, many operations staff personnel may be predisposed to either underprovisioning or overprovisioning, since overprovisioning generally reduces successive complaints, while underprovisioning tends to keep information services costs lower. Varying management goals and principles may drive this result.

Provisioning modifications are performed in response to an indication of misprovisioning to realign the user with a cost appropriate provisioning level. For example, a user initially receives a provisioned environment with 1 cpu w 512 meg. The user invokes a large drafting program, and the XP operating system (OS) will help with large swap file. However, the user then experiences on the order of 1000-1 performance degradation from page faults (thrashing), a trigger indicative of underprovisioning. If the user had a half GB more memory, the page swapping would be substantially reduced. A best-fit rule indicates that is a threshold number of page faults occurs, memory should be increased from 512 MB to 1024 MB, thus adjusting the user provisioning to suit demands.

Figure 1:
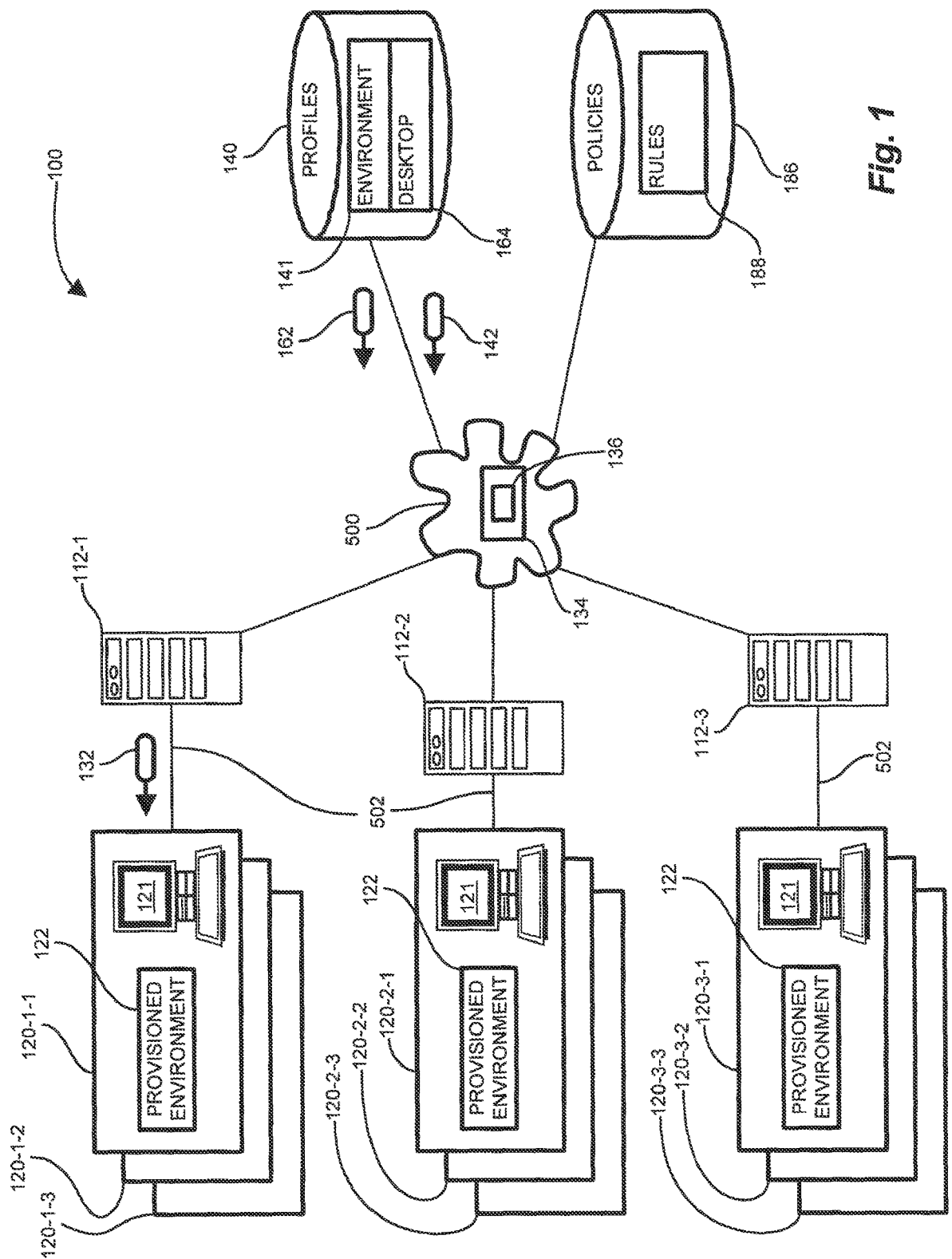
FIG. 1 is a context diagram of an exemplary computing environment employing a network of virtual computing services deployments for use with the present invention.

FIG. 1 is a context diagram of an exemplary virtual computing environment 100 employing a network of virtual computing services deployments 112-1 . . . 112-3 (112 generally) for use with the present invention. Each of the deployments 112 is operable to support a provisioned environment 122 on a user device 120 via a corresponding instantiation of a virtual computing environment (145 FIG. 3, discussed further below) on a corresponding deployment 112. Each of the deployments 112 may be a virtual computing services rack, or cluster, as disclosed in the copending application cited above, or may be another computing resource, such as a specialized grid processing device, discussed below. A provisioner 134, which may execute on one of the deployments 112, receives an environment 142 including a parameter set based on each user's profile and a desktop 162 from a profile repository 140, coupled via a network 500 which also couples the deployments 112 as a grid of computing resources. The environment 142 is stored in an environment repository 141 including usage history, and the desktop 162 is stored in a desktop repository 164, also specific to each user. The environment 142 and desktop 162 are independent, to avoid constraining users with similar desktops (i.e. same department) with similar provisioning. A policy repository 180 also defines rules 188 employed by best-fit logic 136 in the provisioner 134 for selecting the provisioned environment 132 applicable to a given user 120. Best fit logic 136, discussed further below, computes a provisioning instance 132 corresponding to a computing class 144 (FIG. 3) most appropriate to the user 120, for execution as a computing environment 145 on one of the deployments 112 and coupled to a corresponding provisioned environment 122 at the user device 120, typically a thin client operating the GUI 121. The appropriate computing environment 145 includes, but is not limited to, selection of a virtual computing services deployment 112, typically a cluster proximate to the user 120, a general class 144 of computing services (terminal service, hypervisor or grid, discussed further below), and within the class, user parameters. The provisioning environment 100 is periodically reevaluated based on triggering events to reprovision the user as necessary to maintain the best-fit matching.

Example rules applied by the best-fit logic 136, and the policy considerations underlying them, may include, for example:

If user has >x page faults in y hours, then allocate 512 m more memory

If user has less than 5% cpu utilization over y days, then reduce cpu speed 50%

If user has hit >90% CPU utilization for at least a minute (i.e. affecting other users) then move from TS class to hypervisor class If user has hit >90% cpu for 20% of the time, then invoke grid service These rules are exemplary; other rules having different parameters and thresholds will be applicable to different scenarios depending on the management philosophy behind the policy.

The provisioned environment 122 enabled on the user device 120 appears as a standard personal computer desktop, only without the physical PC present and via a thin client network box instead. However, the applications and CPU computations are performed at the computing environment 145, operating as a virtual workstation inside the deployment 112. The display rendering is then transmitted over the network to the thin client device as an environment instance 132, appearing as the provisioned environment 122. This significantly reduces the network traffic over the WAN or LAN, and consolidates network communication across tiers in to the data center housing the selected virtual services deployment supporting the users's provisioned environment 122 with computing environments 145 (FIG. 3 below) running on a respective deployment 112.

Any number of third-party thin client devices are employable for use as a user device 120 responsive to the provisioned environment 120, including Wyse terminals, PDA devices, and even PC's themselves. The thin client devices 120 initiate a connection to the deployment 112 via a Remote Desktop Connection (RDC) client application, as is known in the art, or other suitable connection medium, to the deployment 110 via a URL or other mechanism, generally by a public access network such as the Internet. Alternate continuations may include an enterprise or corporate LAN, WAN, VPN, WiFi, or other specialized network as circumstances dictate. In the example arrangement, the service is registered in UDDI and the service that implements that URI receives the initial request. It then hands off to a connection broker component (124, FIG. 3) that is responsible for either locating and/or starting the environment and returning the address for subsequent exchanges supporting the provisioned environment 122.

The virtual services deployment 112, in one sense, operates similarly to the national power grid. The various services deployments 112-N are disposed in various locations in the network 500 based on the notion of making computation available in the network. This represents an interconnection of resources akin to the North American electrical power grid. Conceptually, the architecture consists of a global catalog and a set of sites where computation is produced. Rather than batch-oriented, these computations are demand-driven in support of interactive end-users via thin client devices 120. This means specifically that demand is somewhat unpredictable, i.e. it can be characterized as being stochastic.

The analogy to the power grid is particularly applicable because it represents a geographically disperse set of unpredictable resource consumers that each require a concurrent minimum level of service. The Power Grid within the US/North America thus may serve as a demand model for the environment 100. For example, ERCOT is one of several, regional "Independent System Operators (ISO)" in the North America system. These manage the scheduling of power on the electric grid in their respective region. Within its region, ERCOT's mission is to direct and ensure reliable and cost-effective operation of the electric grid and to enable fair and efficient market-driven solutions to meet customers' electric service needs. Of course, power distribution provided by the north American power grid is distinctly different from the virtual computing resources disclosed herein as the power grid distributes raw electrical energy in an analog form with no control over this analog signal after generating the sinusoidal impulse at a predetermined rate (60 Hz).

There is, of course, uncertainty inherent in any shared, distributed system that supports a diverse set of workloads. A viable operation should be resilient in the face of failure as well as deal with unexpected and time-varying demand. Ultimately, the physical infrastructure provided by the set of deployments 112-1 . . . 112-N may be viewed as manufacturing plant that is shared amongst several workloads, each gaining access to sufficient capacity to meet their respective demand forecasts and the supporting scheduled delivery of plant capacity. In configurations herein, capacity is repurposed as demand varies. The implication of this dynamic repurposing of physical computers is that (a) there is some form of scheduling and (b) all of the prerequisite inputs are available in advance of a particular schedule being enacted.

Figure 3:
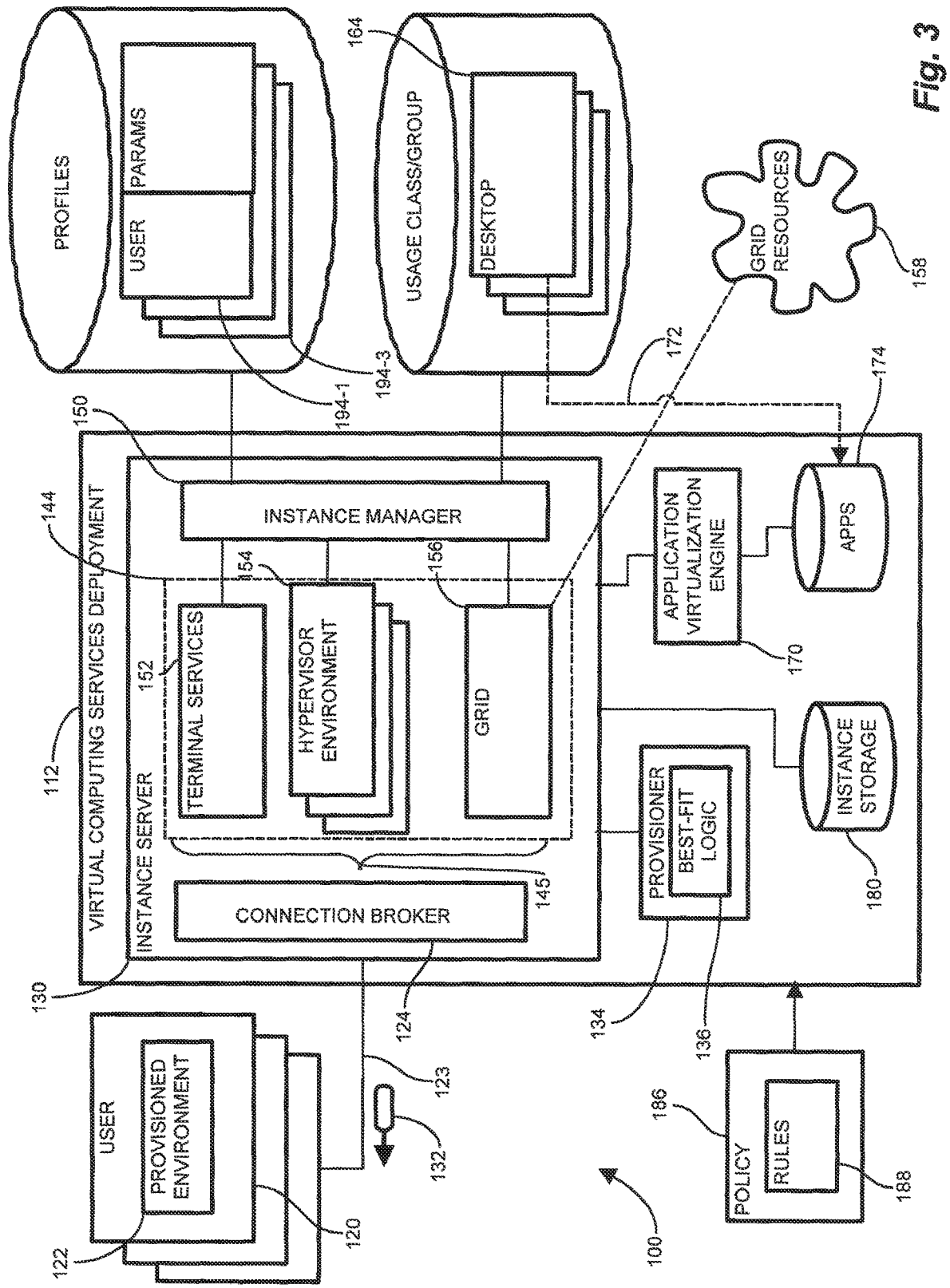
FIG. 3 is a block diagram of multiple computing services deployments in the environment of FIG. 1.
Figure 4:
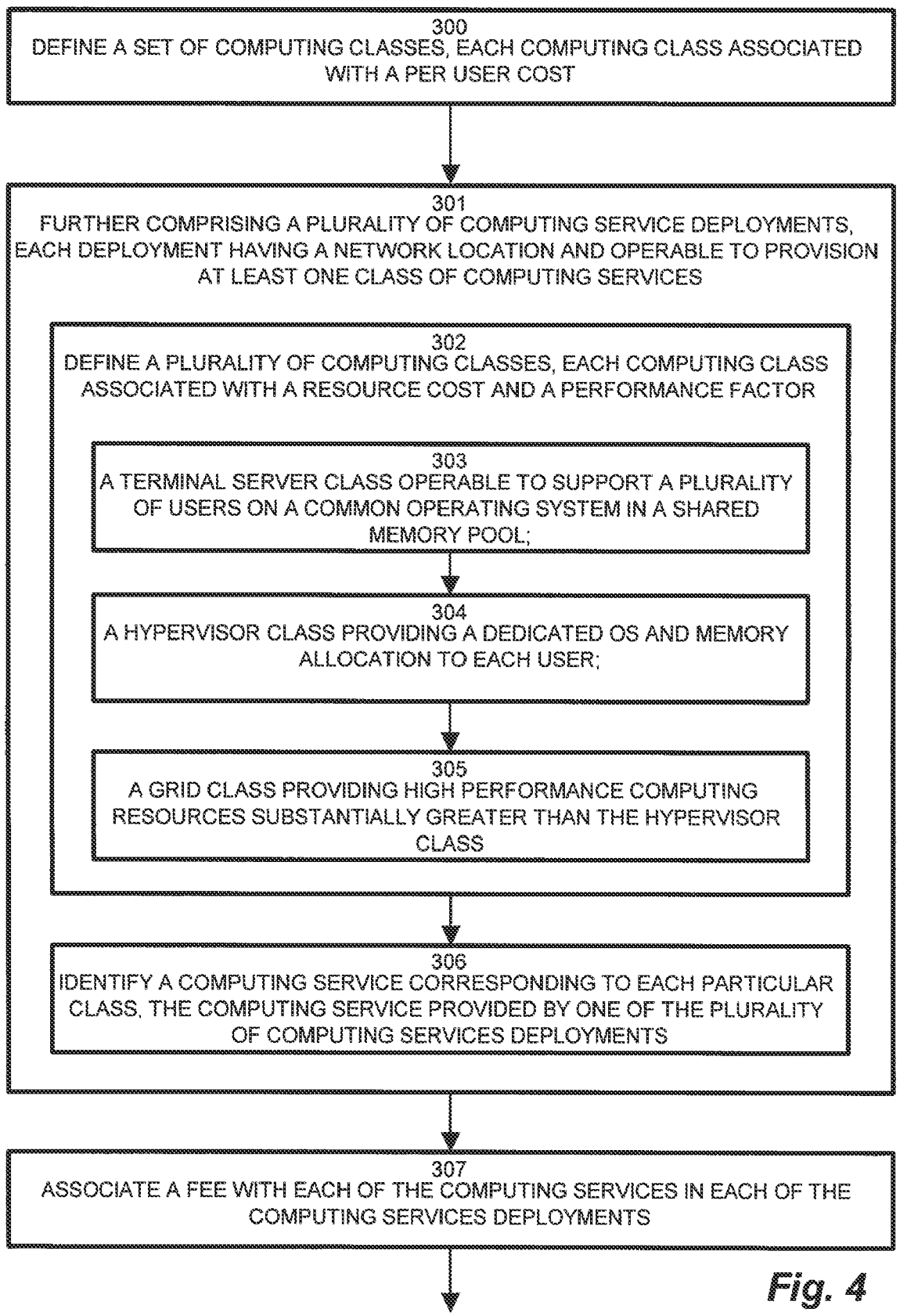
FIGS. 4-7 are a flowchart of provisioned deployment in the diagram of FIG. 3.
Figure 5:
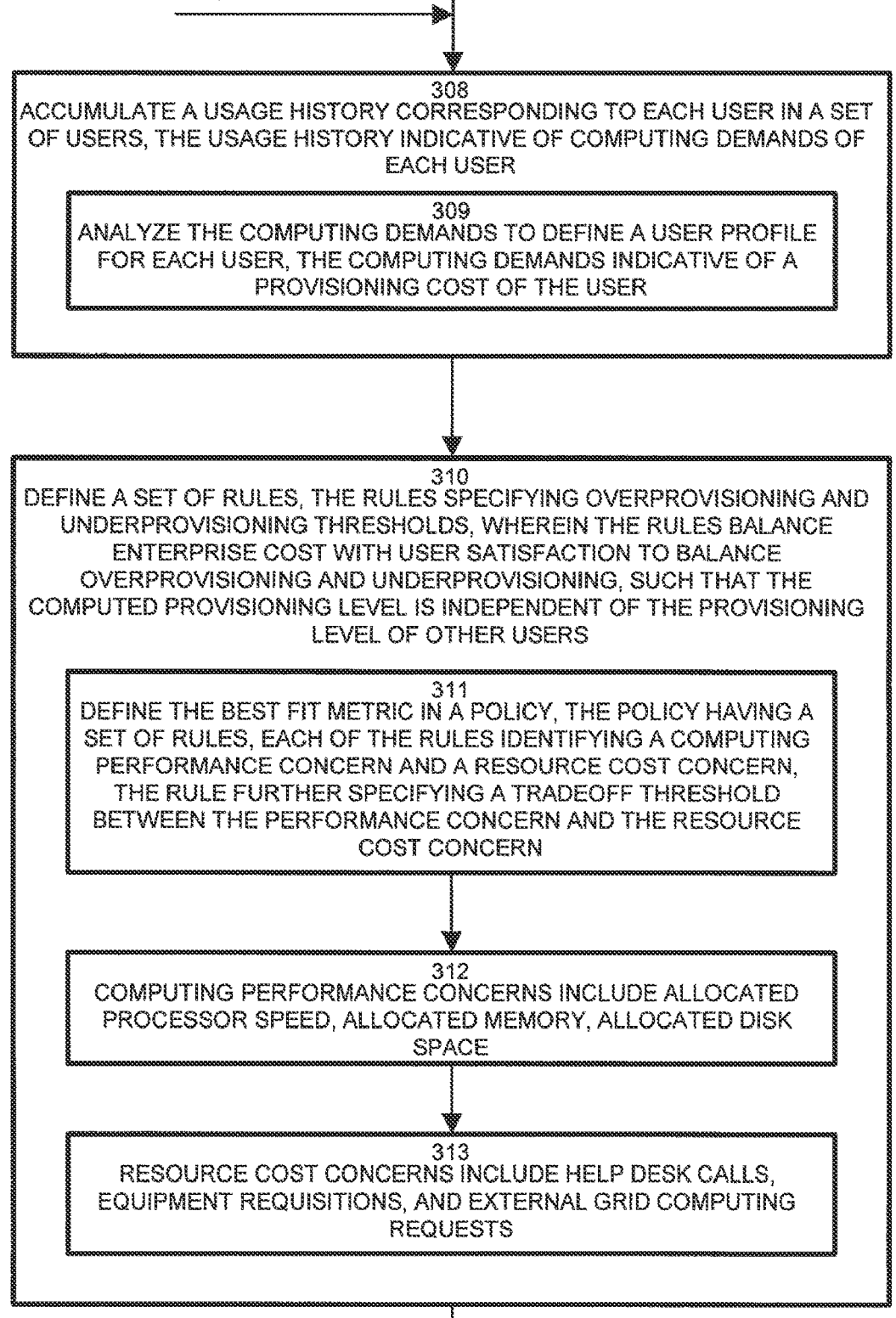
Figure 6:
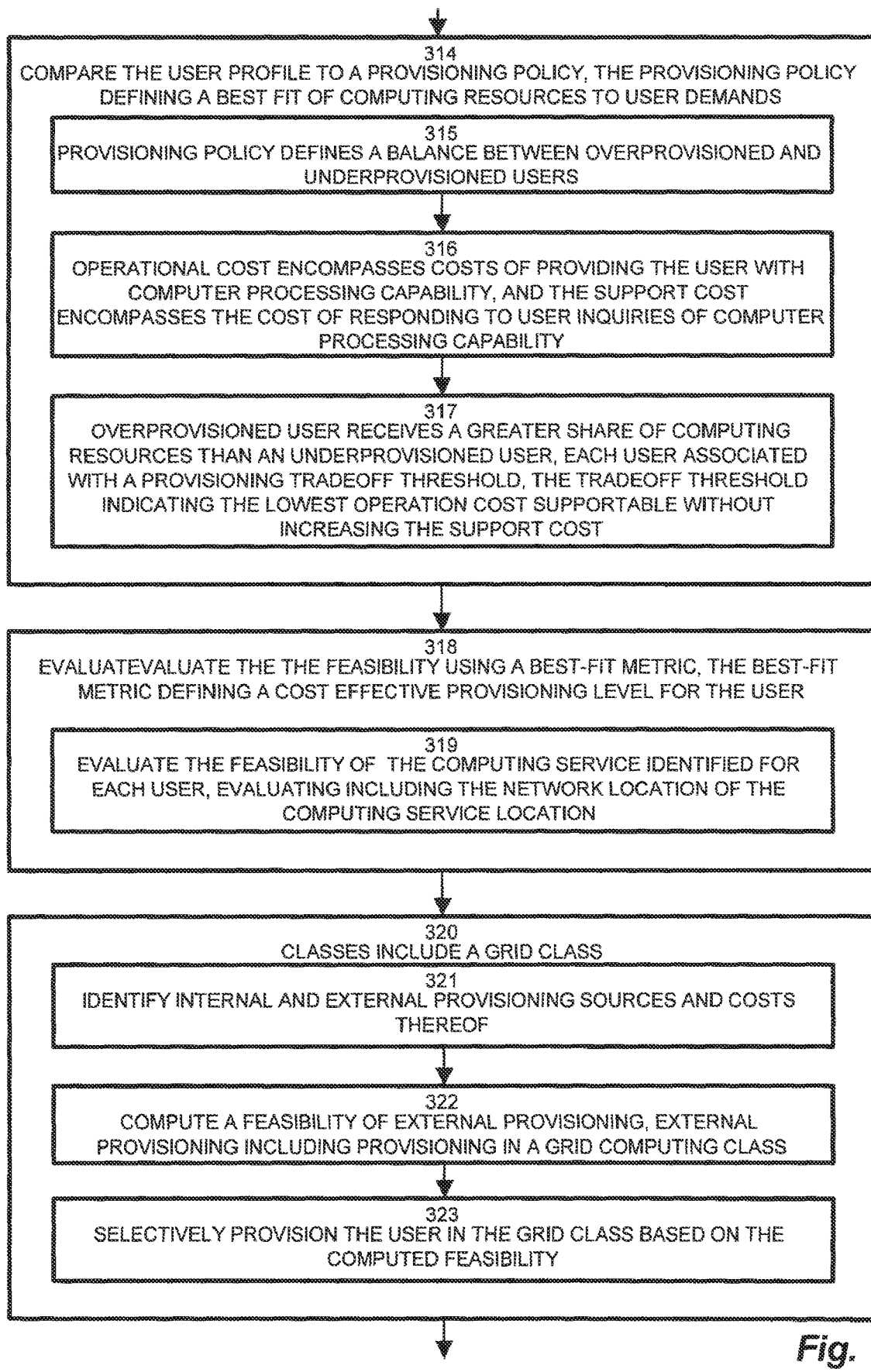
Figure 7:
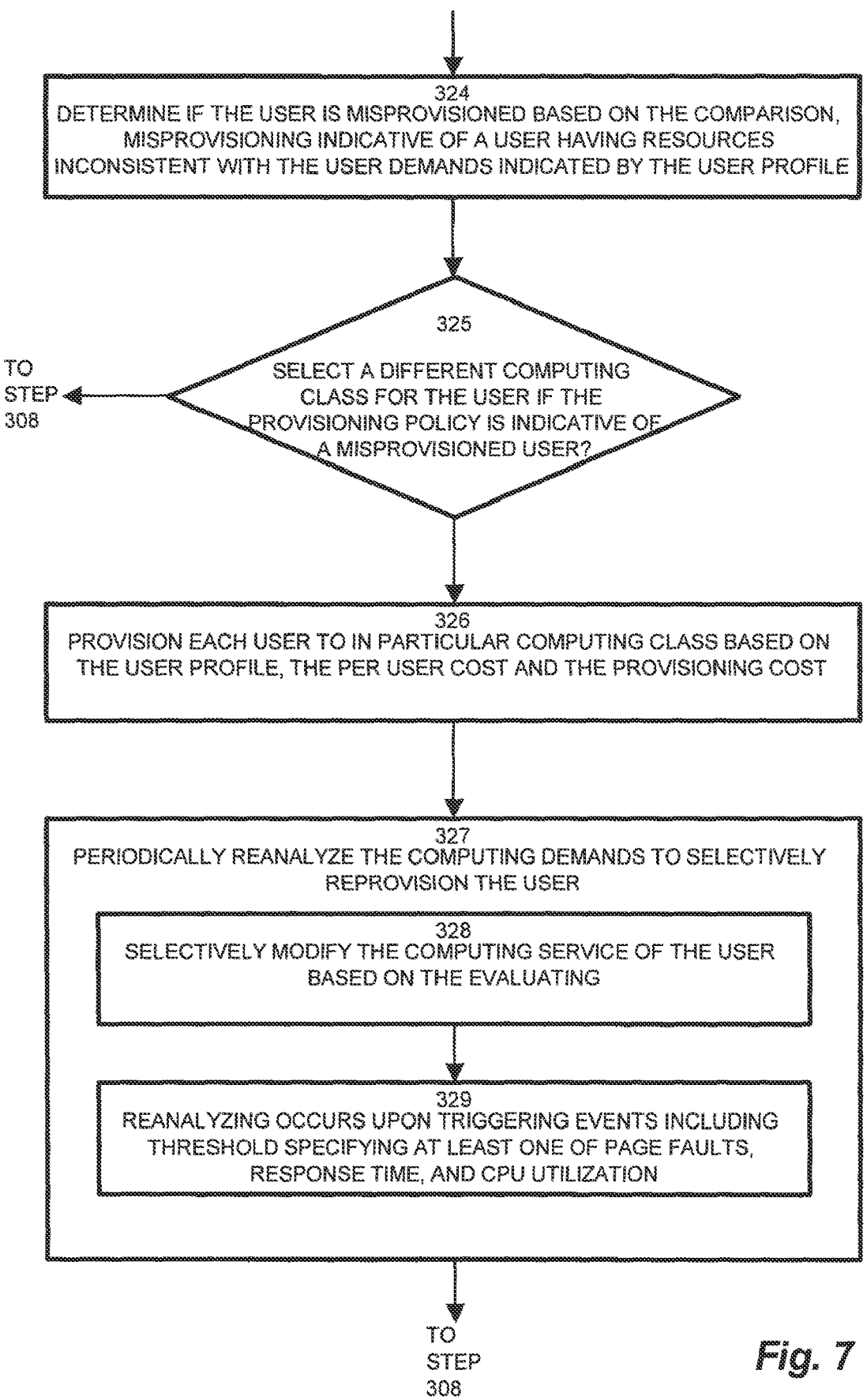

A particular "service" hosted in on the virtual services environment 100 is primarily a set of policies (i.e. Service Level Agreements) governing how a specialized set of computations, collectively referred to as a ³Service,² will be delivered to a target constituency or "market." Using the provisioned environment 120 as an example service, there are two tasks that must be addressed: demand forecast and capacity scheduling. This service is concerned with providing a user access to a desktop session via the network. The end user's request for a desktop instance 132 is brokered via a mediation layer referred to as the connection broker 124 (FIG. 3). This is a core service that can be thought of as an application-oriented, IP load balancer.

In the desktop 164 example, the connection broker 124 first determines the requesting user's identity and class of desktop specified in their subscription. Once this is determined, the second step in this process is to find a properly configured desktop 164 system sitting in inventory. If successful the system is assigned to the user for the duration of their session and specialized/personalized for their specific use. Finally, the connection broker 124 returns instructions to the requesting user 120 on how to connect to their desktop.

The physical deployment topology is designed to minimize latency and maximize fault tolerance and disaster recovery capabilities. Similar to an Akamai-like edge network, the disclosed environment 100 relies on a set of distributed locations where the deployments 112, typically implemented as equipment racks, stand ready to become the primary service provider for an end user 120. The racks are stateless wholly integrated clusters (e.g. deployments 112) that can automatically provision desktops and requested applications from bare-metal at a moment's notice, assembling personalized functionality on the basis of security policies and individual preferences associated with an end user's identity.

For example, if a call center employee is relocated from the New Jersey office to an office in Tokyo, the precise configuration and capabilities are instantly available upon login at the new location, with no loss of quality or performance. Similarly, if a developer is working on a certain program on a set of procured servers in one location, he can log-in anywhere in the world and continue his work with no apparent differences. While each location around the world in the distributed network has self-contained storage, the data is regularly backed up to the master data center, providing robust archiving and data integrity and an usually efficient "roll-back" mechanism to previous-state configurations.

Figure 2:
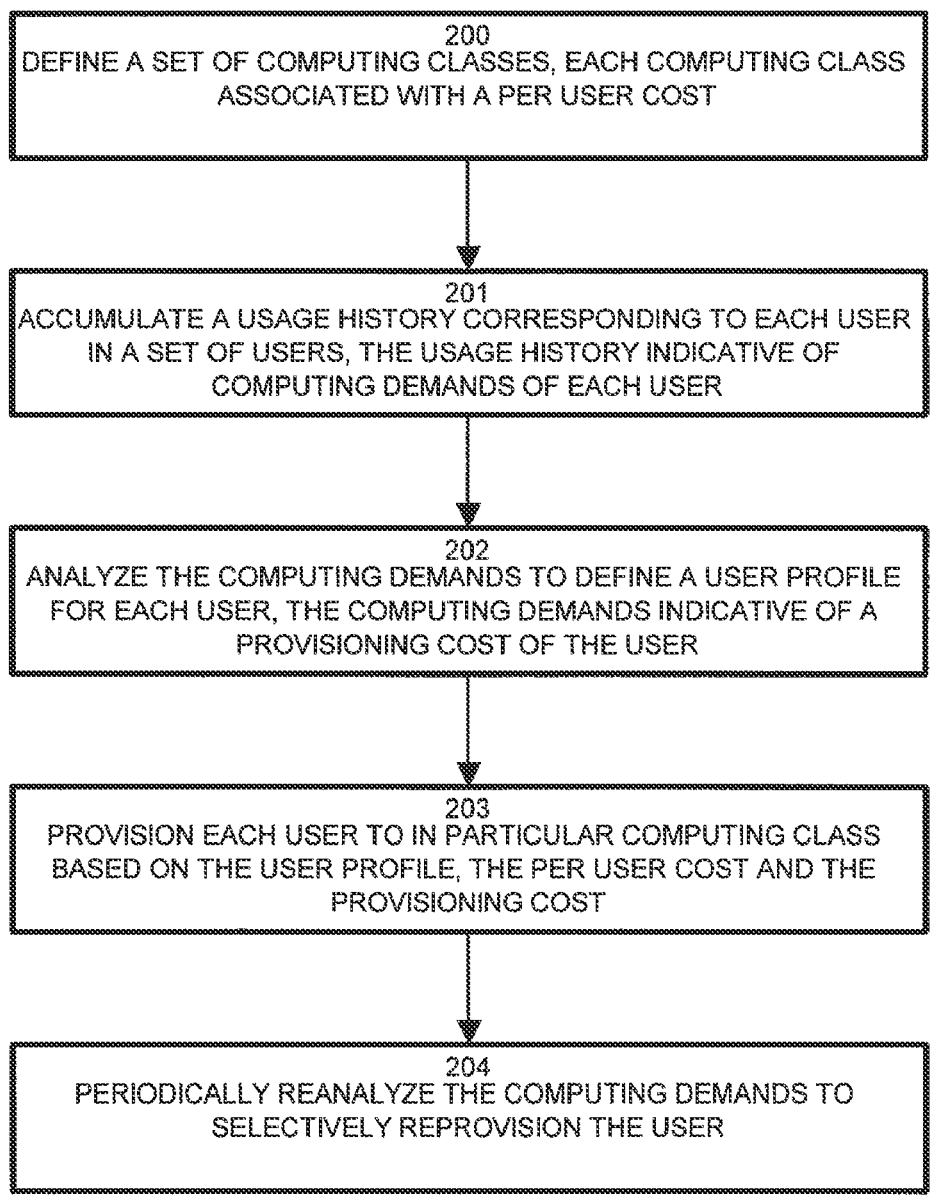
FIG. 2 is a flowchart of provisioning in the computing environment of FIG. 1.

FIG. 2 is a flowchart of provisioning in the computing environment of FIG. 1. Referring to FIGS. 1 and 2, the virtual computing environment 100 provides, at step 200, a method of managing computing infrastructure costs by defining a set of computing classes 144, such that each computing class is associated with a per user cost, and accumulating a usage history corresponding to each user 120 in a set of users 120-N, in which the usage history defines a user profile 142 indicative of computing demands of each user 120, as disclosed at step 201. The environment 100 regularly analyzes the computing demands to define and/or refine the user profile 142 for each user 120, in which the computing demands are indicative of a provisioning cost of the user 120, as depicted at step 202. A virtual computing services deployment 112 (deployment), typically a cluster of computing servers and peripherals at various deployment locations in the environment 100, provisions each user in a particular computing class 144 based on the user profile 142, the per user cost and the provisioning cost of the class 144, as shown at step 203. Ongoing best-fit provisioning occurs by periodically reanalyzing the computing demands to selectively reprovision the user, as depicted at step 204.

FIG. 3 is a block diagram of virtual computing provisioning in the environment of FIG. 1. Referring to FIGS. 1 and 3, each of the virtual computing services deployments 112 is operable to provision one or more of the service classes 152, 154, 156 (144, collectively) as shown in FIG. 3, and is operable to provision a user 120 on any of the other deployments 112-N via the network 500. The connection broker 124 receives an indication of the instance server 130 selected by the provisioner 134 using the best fit logic 136, and informs the selected instance server 130 to instantiate a computing environment 145 supporting a provisioned environment 122 at the corresponding user device 120. Often this may be the most local instance server, however network location is only one of many factors weighed by the best fit logic 136.

The virtual computing services deployment 112 takes the form of one or more virtual computing services racks 110, equipped and implemented as follows. The instance server 130 further includes an instance manager 150 for maintaining computing environments 152, 154 and 156 (collectively shown as 145) for each class 144. The computing environments 152, 154 and 156 support the provisioned environments 122 by defining the respective memory, CPU and 1/0 operations in each environment 122. The user device 120 is typically a low cost telecommunication device having sufficient capabilities to exchange keystrokes and mouse operations, as well as a display screen, but typically retains no nonvolatile storage (i.e. disk drives) and operates as a rendering device for the provisioned environment 122 for the user with respect to the computing environments 152, 154 and 156 at the instance server 130.

Upon provisioning, which occurs at initial login as well as according to predetermined intervals as defined herein, the provisioner 134 employs a user profile 142 from a profile repository 140 to assign a provisioning class (class) 144 to the user device 120, and also assigns a separate desktop 162 from a desktop repository. The class 144 indicates the level of computing resources provided to the user 120 by the instance server 130 via the environment instance 132, which in the example configuration corresponds to a terminal server 152 class, a hypervisor class 154, and a grid class 156, discussed in further detail below. A connection broker 124 establishes communication between the instance server 130 and the provisioned environment 122 via the environment instance 132.

The provisioner 134 employs the best-fit logic 136 including a history of previous computing activity in the profile database 140 by the user 120 in the profile database 140 to determine the class 144. The profile includes, for each user 120, an entry 142 having the identity of the user, and environment parameters applicable to the user 120, including memory allocation, cpu speed, and I/O (disk) capacity. These parameters represent the current provisioning of the level and are recomputed and/or verified by the best fit logic 136 at each provisioning evaluation to maintain the user at an appropriate provisioning level.

The instance server 130 instantiates a portion of available resources as an environment instance 132 for each provisioned environment 122 deployed on a user device 120. Each environment instance 132 is based on a particular class 144, and corresponds to a computing environment 145. In the example configuration, the classes 140 include a terminal server (TS) class 152, intended for low usage demand users, and supporting a plurality of users in a common memory with a shared operating system. A hypervisor class 154 provides OS and memory isolation for users with more specific usage demands, generally greater than the TS class 152, and preallocates a portion of available memory and CPU resources for exclusive use for a user 120. Extreme usage demands invoke the grid class 156, which delegates computing to an external computing grid 158 where computing "horsepower" is provided on a fee-for-services basis, particularly for short term intense needs. The grid 158 operates as another deployment 112 accessible via the network 500, and may be a more robustly equipped cluster providing multiple service classes 144, or may be a highly specialized computing engine reserved for high performance (typically with commensurate cost) computing.

The instance manager 150 also retrieves a desktop 162 from an environment repository 141, which may be the same as the profile DB 140 or a distinct physical repository. The environment repository stores desktops 164 for each user 120 including the application suite 166 and operating system 168 for each user. The desktop 164 is independent from the provisioning class 144, thus allowing users from the same group (i.e. serving a particular business function such as legal, accounting, HR, etc.) to have common application arrangements without necessarily being bound to similar provisioning classes 144. Such an arrangement also avoids the need to place similar users (i.e. from the same group) in the same provisioning "bucket", for example having highly mathematical intensive applications of the accounting group served by the same terminal services instance 152.

The application virtualization engine 170 operates in conjunction with the desktop 164 to provide each user with needed applications. As shown by dotted line 172, the application virtualization engine 170 retrieves applications from an application repository 174 for invocation by the computing environments 145. The application virtualization engine 170 makes desktop 166 enabled applications available, and also coordinates user/license provisions to maintain appropriate application/user invocation.

An instance storage volume 180 provides mass storage services to each of the environment instances 132, in effect acting as the local disk drive for each user device 120. The instance storage provides efficient storage, with high availability, and tight integration (emulating the appearance of local drives) by using a clustered file system combined with local RAID storage implemented and infiniband access for high throughput, as is known in the art.

FIGS. 4-7 are a flowchart of provisioned deployment in the diagram of FIG. 3. Referring to FIGS. 1 and 3-7, the deployments 112 in the virtual computing (grid) environment 100 provide virtual computing services by defining a set of computing classes, such that each computing class is associated with a per user cost, as depicted at step 300. The environment 100 further includes a plurality of computing service deployments 112, in which each deployment has a network 500 location and is operable to provision at least one class 144 of computing services, as shown at step 301. Each deployment 112 thus defines a plurality of computing classes 152, 154, 156 such that each computing class is further associated with a resource cost and a performance factor, as shown at step 302. In the example arrangement, the computing classes 144 include, but are not limited to, a terminal server class operable to support a plurality of users on a common operating system in a shared memory pool, as depicted at step 303, a hypervisor class providing a dedicated OS and memory allocation to each user, disclosed at step 304, and a grid class providing high performance computing resources substantially greater than the hypervisor class, as shown at step 305.

Upon a request from a user device 120, the invoked deployment 112 identifies a computing service level corresponding to each particular class 144, such that the computing service is provided by one of the plurality of computing services deployments 112-N via the network 500, as depicted at step 306. The environment 100 associates a fee with each of the computing services, according to class 144, in each of the computing services deployments 112, as shown at step 307.

The ongoing environment 500 accumulates a usage history corresponding to each user 120 in a set of users, in which the usage history is indicative of the computing demands of each user 120, as shown at step 308. The provisioner 134 analyzes the computing demands to define a user profile 142 for each user 120, in which the computing demands are indicative of a provisioning cost of the user 120, as depicted at step 309.

The policy 186 defines a set of rules 188, such that the rules specify overprovisioning and underprovisioning thresholds, in which the rules 186 balance enterprise cost with user satisfaction to balance overprovisioning and underprovisioning, and further that the computed provisioning level (class 144) is independent of the provisioning level of other users 120, as disclosed at step 310. The policy 186 reflects the management philosophy of the enterprise towards user provisioning. While the best fit metric 136 strives for optimal efficiency, this management philosophy may augment the best-fit rules to err on the side of cost control or high performance.

Accordingly, the environment 100 defines the best fit metric 136 in the policy 186, the policy 186 having a set of rules 188, in which each of the rules identifies a computing performance concern and a resource cost concern, such that the rule further specifies a tradeoff threshold between the performance concern and the resource cost concern, as disclosed at step 311. In the example configuration, the computing performance concerns include allocated processor speed, allocated memory, and allocated disk space, generally indicative of parameters which proportionally increase the level of provisioning to the user 120, as depicted at step 312. The resource cost concerns include help desk calls, equipment requisitions, and external grid computing requests, as depicted at step 313, and generally denote factors that increase cost. The rules 188, denoted in an example form above, strike the tradeoff between these concerns as codified in the best-fit logic 136.

Upon a request to provision a user, responsive to a user 120 request for an environment instance 132, provisioning further includes, therefore, comparing the user profile to a provisioning policy 186, such that the provisioning policy defining a best fit of computing resources to user demands, as shown at step 314. The best-fit logic 136 implements the provisioning policy by defining a balance between overprovisioned and underprovisioned users 120, in which an overprovisioned user is associated with a higher operational cost than an underprovisioned user 120, while an underprovisioned user may be associated with a higher support cost than an overprovisioned user, as denoted at step 315.

In provisioning the user, the operational cost encompasses costs of providing the user with computer processing capability, while the support cost encompasses the cost of responding to user inquiries of computer processing capability, as shown at step 316. Thus, an overprovisioned user receives a greater share of computing resources than an underprovisioned user, in which each user associated with a provisioning tradeoff threshold, the tradeoff threshold indicating the lowest operation cost supportable without increasing the support cost, as depicted at step 317.

The provisioner 134 resolves these competing ends by evaluating the feasibility using a best-fit metric (logic) 136, such that the best-fit metric 136 defines a cost effective provisioning level for the user, as shown at step 318. This includes, at step 319, evaluating the feasibility of the computing service (class 144) identified for each user 120, such that evaluating includes the network location of the computing service location (i.e. where the deployment 112 is located) relative to the particular user, as depicted at step 319. Each of the deployments 112 is operable to invoke the connection broker 124 to provision the user 120 on another deployment 112, if costs and/or network distance deem it more effective according to the best-fit logic 136.

The classes include a grid class 156, as shown at step 320, which may denote an external invocation of computing resources, effectively contracting out the need for computing ability, usually because of extreme demand and/or a temporary nature of the resource need. Such a circumstance requires identifying internal and external provisioning sources and costs thereof, as depicted at step 321, and computing a feasibility of external provisioning, such that external provisioning includes provisioning in the grid computing class 156, as disclosed at step 322. The grid may be considered separately from "on board" classes provided directly by the deployments because of the relatively higher cost than obtaining the same processing resources from the hypervisor 154 or terminal server 152 classes, usually due to consideration of the impact on other users 120. Accordingly, the provisioner 134 selectively provisions the user 120 in the grid class 156 based on the computed feasibility, as depicted at step 323.

Following the comparison at steps 314 and 320, the provisioner determines if the user is misprovisioned based on the comparison, in which misprovisioning is indicative of a user having resources inconsistent with the user demands indicated by the user profile, as shown at step 324. Accordingly, a check is performed at step 325 and the provisioner 134 selects a different computing class 144 for the user 120 if the provisioning policy 186 as implemented by the best-fit logic 136 is indicative of a misprovisioned user, as shown at step 325. If the user 120 is misprovisioned, control reverts to step 308 to reanalyze the user 120 demands. Otherwise, the instance manager 150 provisions the user in the particular computing class based on the user profile, the per user cost and the provisioning cost, as resolved by the best-fit logic applied to the current usage indicated by the user profile, depicted at step 326.

The user 120 continues via the provisioned environment 122, while the provisioner periodically reanalyzes the computing demands to selectively reprovision the user 120, as depicted at step 327. Thus, the provisioner 134 selectively modifies the computing service (class 144) of the user 120 based on the evaluating, as shown at step 328. Such periodically reanalyzing occurs upon triggering events including threshold specifying at least one of page faults, response time, and CPU utilization, all of which are typically associated with an underprovisioned user, as depicted at step 329, as well as other events which may denote an overprovisioned user, such as upon logout or periodic time intervals. Control then reverts to step 308 pending the next reevaluation.

Those skilled in the art should readily appreciate that the programs and methods for provisioned virtual grid computing as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for provisioned virtual grid computing has been particularly shown and described with references to embodiments thereof, it will be understood by those skilled in the art that various changes in form and details may be made therein without departing from the scope of the invention encompassed by the appended claims.

What is claimed is:

1. A method comprising:
    selecting a first computing class of a plurality of computing classes for a first user, wherein each computing class of the plurality of computing classes is associated with a respective level of computing resources;
    instantiating a first virtual computing environment for the first user using a first portion of available computing resources of at least one computer, the first portion being based on the first computing class selected for the first user, the first portion including memory and processor resources of the at least one computer;
    after instantiating the first virtual computing environment, selecting a second computing class of the plurality of computing classes for the first user; and
    in response to selecting the second computing class for the first user, instantiating a second virtual computing environment for the first user using a second portion of available computing resources of the at least one computer, the second portion being based on the second computing class selected for the first user, the second portion being different than the first portion, wherein selecting the second computing class for the first user is in response to occurrence of a triggering event, and the triggering event comprises one or more of a threshold number of page faults, a threshold response time, or a threshold processor utilization.

2. The method of claim 1, further comprising:

selecting the first computing class of the plurality of computing classes for a second user; and instantiating a third virtual computing environment for the second user using a third portion of available computing resources of the at least one computer, the third portion being based on the first computing class selected for the second user, the third portion including memory and processor resources of the at least one computer.

3. The method of claim 1, wherein selecting the first computing class of the plurality of computing classes for the first user comprises:

analyzing a usage history for the first user, the usage history indicative of computing demands for the first user; and selecting the first computing class based on the usage history.

4. The method of claim 1, wherein the second portion includes less computing resources than the first portion.

5. The method of claim 1, wherein the second portion includes more computing resources than the first portion.

6. The method of claim 1, wherein the first portion of available computing resources comprises resources of a first computer, and the second portion of available computing resources comprises resources of a second computer.

7. The method of claim 1, wherein the first portion of available computing resources comprises resources of a first computer, and the second portion of available computing resources comprises resources of the first computer.

8. One or more non-transitory computer-readable media comprising instructions, which when executed by a computing system, cause the computing system to perform operations comprising:

selecting a first computing class of a plurality of computing classes for a first user, wherein each computing class of the plurality of computing classes is associated with a respective level of computing resources;

instantiating a first virtual computing environment for the first user using a first portion of available computing resources of at least one computer, the first portion being based on the first computing class selected for the first user, the first portion including memory and processor resources of the at least one computer;

after instantiating the first virtual computing environment, selecting a second computing class of the plurality of computing classes for the first user; and in response to selecting the second computing class for the first user, instantiating a second virtual computing environment for the first user using a second portion of available computing resources of the at least one computer, the second portion being based on the second computing class selected for the first user, the second portion being different than the first portion, wherein selecting the second computing class for the first user is in response to occurrence of a triggering event, and the triggering event comprises one or more of a threshold number of page faults, a threshold response time, or a threshold processor utilization.

9. The one or more non-transitory computer-readable media of claim 8, the operations further comprising:

selecting the first computing class of the plurality of computing classes for a second user; and instantiating a third virtual computing environment for the second user using a third portion of available computing resources of the at least one computer, the third portion being based on the first computing class selected for the second user, the third portion including memory and processor resources of the at least one computer.

10. The one or more non-transitory computer-readable media of claim 8, wherein selecting the first computing class of the plurality of computing classes for the first user comprises:

analyzing a usage history for the first user, the usage history indicative of computing demands for the first user; and selecting the first computing class based on the usage history.

11. The one or more non-transitory computer-readable media of claim 8, wherein the second portion includes less computing resources than the first portion.

12. The computer system of claim 11, wherein selecting the second computing class for the first user is in response to occurrence of a triggering event.

13. The computer system of claim 12, wherein the triggering event comprises one or more of a threshold number of page faults, a threshold response time, or a threshold processor utilization.

14. The computer system of claim 11, the operations further comprising:

selecting the first computing class of the plurality of computing classes for a second user; and instantiating a third virtual computing environment for the second user using a third portion of available computing resources of the at least one computer, the third portion being based on the first computing class selected for the second user, the third portion including memory and processor resources of the at least one computer.

15. A computer system comprising:

memory storing instructions; and one or more processors configured to execute the instructions to perform operations comprising:

selecting a first computing class of a plurality of computing classes for a first user, wherein each computing class of the plurality of computing classes is associated with a respective level of computing resources;

instantiating a first virtual computing environment for the first user using a first portion of available computing resources of at least one computer, the first portion being based on the first computing class selected for the first user, the first portion including memory and processor resources of the at least one computer;

after instantiating the first virtual computing environment, selecting a second computing class of the plurality of computing classes for the first user; and in response to selecting the second computing class for the first user, instantiating a second virtual computing environment for the first user using a second portion of available computing resources of the at least one computer, the second portion being based on the second computing class selected for the first user, the second portion being different than the first portion, wherein selecting the first computing class of the plurality of computing classes for the first user comprises:

analyzing a usage history for the first user, the usage history indicative of computing demands for the first user; and selecting the first computing class based on the usage history.

* * * * *